Patented May 1, 1923.

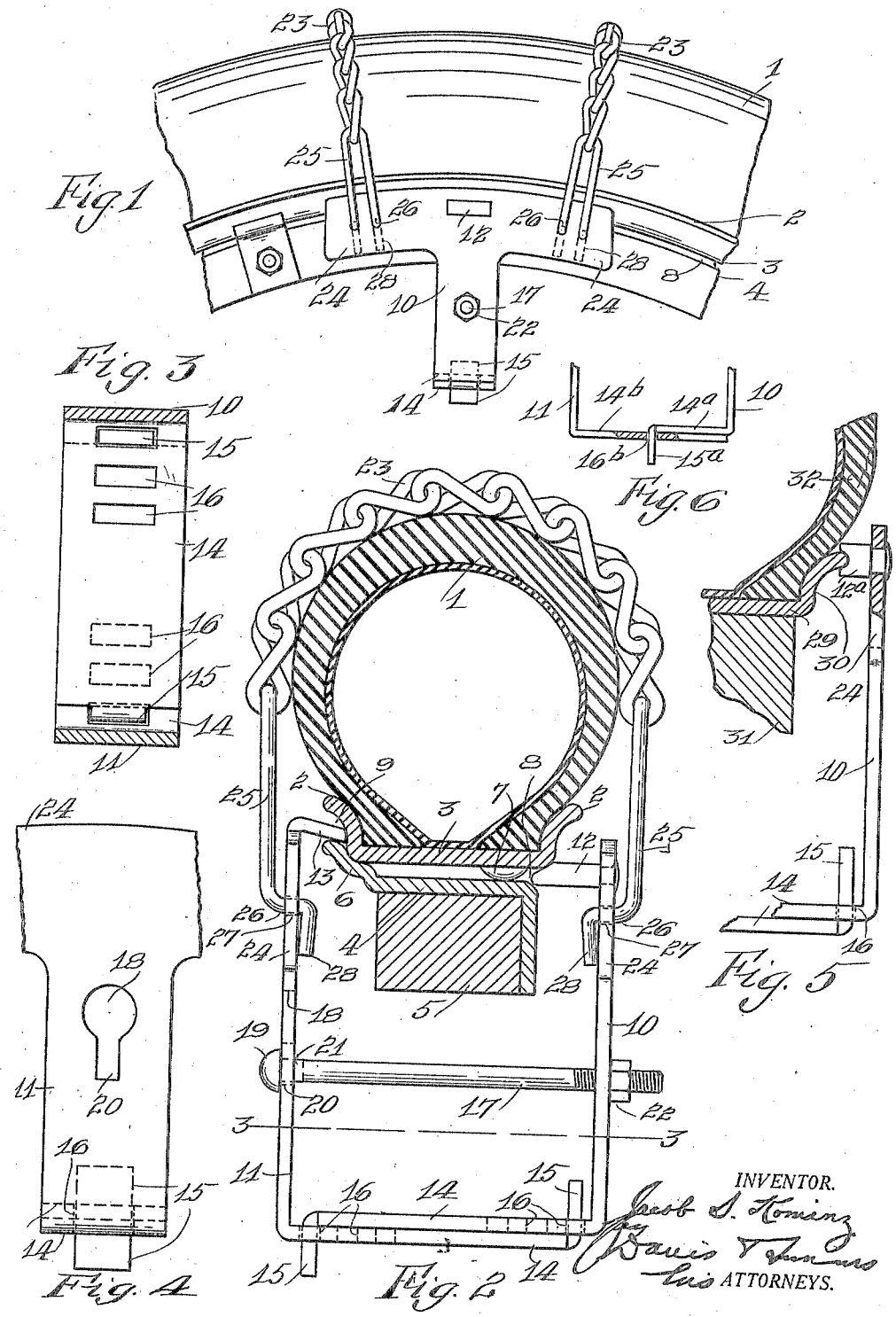

1,453,276

UNITED STATES PATENT OFFICE.

JACOB S. KOMINZ, OF ROCHESTER, NEW YORK.

NONSKID ATTACHMENT FOR VEHICLE WHEELS.

Application filed July 15, 1921. Serial No. 485,063.

*To all whom it may concern:*

Be it known that I, JACOB S. KOMINZ, a citizen of the United States, and resident of Rochester, in the county of Monroe and State of New York, have invented certain new and useful Improvements in Nonskid Attachments for Vehicle Wheels, of which the following is a specification.

The present invention relates to non-skid attachments for vehicle wheels and more particularly to the type in which non-skid devices pass around the tires and are supported by clamping devices to the wheel, an object of this invention being to provide attaching or clamping means which may be mounted on wheels of different width without requiring any modification of the wheel structure. Another object of the invention is to provide a clamping means which is adapted for attachment to a wheel having a demountable rim on which the tire is mounted without requiring the modification of any portion of the wheel and without liability of injury to the tire. A further object of the invention is to provide an improved connection between the non-skid device and the clamping device which permits the non-skid device to be readily detached from the clamping device while, at the same time, effectively holding the non-skid device in connection with the clamping device during the use of the invention.

To these and other ends, the invention consists of certain parts and combinations of parts all of which will be hereinafter described, the novel features being pointed out in the appended claims.

In the drawings:—

Fig. 1 is a fragmentary view of the wheel showing one of the non-skid attachments applied thereto;

Fig. 2 is a sectional view through the wheel showing the non-skid attachment in side elevation;

Fig. 3 is a section on the line 3—3, Fig. 2;

Fig. 4 is a fragmentary face view of the clamping devices with the non-skid devices and the connecting bolt removed;

Fig. 5 is another modification of the non-skid attachment attached for use on a wheel on which the tire is received on a rim fixed to the felly; and Fig. 6 is a fragmentary view showing another form of the interlocking connection between the two clamping members.

Referring more particularly to the drawings, 1 indicates a tire which is held in the usual manner within the flanges 2 of a demountable rim 3, the latter resting upon a fixed rim 4 on a felly 5, the fixed rim having as usual a flange 6 along one edge and the demountable rim having spacing lugs 7 engaging the perimeter of the fixed rim 4. The space 8 between the demountable rim 3 and the fixed rim 4, as well as the space 9 between the flange 6 on the fixed rim and the flange 9 on the demountable rim, are used for securing the clamping or attaching devices so that it is unnecessary to modify the vehicle wheel in any manner whatsoever in order to effect the securing of the non-skid attachment.

The clamping means embodies two clamping members 10 and 11, the clamping member 10 having a projection 12 for engaging in the space 8 at one side of the demountable rim and the clamping member 11 having a projection 13 for engaging in the space 9 between the flanges 2 and 6. It is apparent that these projections 12 and 13 are situated at different distances from the center of the wheel due to the fact that the spaces 8 and 9 are situated at different distances from such center. The clamping members 10 and 11 are adjustably connected together on the inner periphery of the felly 5, and this adjusting means, in this instance, comprises an arm 14 extending inwardly or laterally from each member, the two arms lying in overlapping relation. These arms have adjustable interlocking means which, in the embodiment illustrated in Figs. 1–5, consists of a projection or lug 15 turned laterally from each arm 14 at the end of such arm and extended through one of the openings 16 in the other arm, these openings being arranged in series situated at different points along the length of the arms 14. It is apparent that by this arrangement the projections 12 and 13 may be positioned at different distances from each other.

With the end in view of drawing the projections 12 and 13 firmly against opposite sides of the wheel, the clamping members 10 and 11 may be connected between the adjustable connecting means and the projections 12 and 13 by a bolt 17, such bolt having a novel connection with the member 11, that is usually situated on the inside of the wheel, which permits the attachment of the bolt from the outside of the wheel. This connection consists in providing the member 11 with an opening 18, which is larger than the head 19 of the bolt, and a slot 20 leading from the opening 18 in which a reduced portion 21 adjacent the head 19 of the bolt is passed, the opposite sides of this reduced portion being flattened so as to prevent the turning of the bolt in the slot. It is apparent that, by this arrangement, the head of the bolt may be passed through the opening 18 from the outside of the wheel and then the reduced portion may be received within the slot 20. Thereafter the clamping member 10 is fitted over the bolt 17 and the nut 22 is secured in position, drawing the two projections 12 and 13 against opposite sides of the wheel into the spaces 8 and 9.

The clamping members may be connected by one or more non-skid devices but, in this instance, two of such devices are employed. These devices are preferably in the form of small pieces of chain 23 secured to arms 24 extending in opposite directions from the clamping members 10 and 11.

The securing means is of novel construction and permits the ready disconnection of the chains from the clamping means, while at the same time insuring their maintenance of connection during the use of the invention. These securing means are in the form of U-shaped members having main portions 25 adapted to pass through the links at opposite ends of the chains and having their arms deflected laterally at 26 substantially at right angles to such main portions, so as to pass through openings 27 adjacent the ends of the arms 24, and then inwardly at 28, substantially parallel with the main portions 25, so that the portions 28 will abut the inner face of the arms 24 while the main portions will lie on the outer face. When the chains are around the tire the tension of the chains will hold the connection between the securing members and the clamping members, but when the non-skid attachment is removed from the tire the U-shaped securing members may be turned so as to draw the ends 28 through the openings 27, thus disconnecting the securing devices from the clamping means.

In Fig. 5 of the drawings, the device is shown for attachment to another form of wheel in which a rim 29 with flanges 30 at opposite sides fits on a felly 31, the tire 32 being received between the flanges 30. In this construction of the invention the clamping members 10 and 11, the member 10 only being shown, are provided with projections or lugs 12$^a$ which are recessed or notched to receive the edges of the flanges 30, and these lugs 12$^a$ are situated the same distance from the center of the wheel. The other parts of this construction are identical with that shown in Figs. 1–4.

In Fig. 6 another means of connecting the members 10 and 11 is shown. In this construction only one of the overlapping members 14$^a$ is provided with a projection 15$^a$, while the other member 14$^b$ has but a single opening 16$^b$. The member 14$^a$ is only about one-half the length of the member 14$^b$, and the opening 16$^b$ is centrally arranged with respect to the member 14$^b$. The other parts of this device are substantially the same as similar parts illustrated in Figs. 1–4.

From the foregoing it will be seen that there has been provided a non-skid attachment for vehicle wheels in which provision has been made for clamping the same upon wheels of different thicknesses without making any modification in the wheel. In the embodiment of the invention the clamping device is arranged to cooperate with the walls of the spaces between a demountable rim and a fixed rim on opposite sides of the wheel, this being secured by providing projections on two clamping members and these projections being situated at different distances from the center of the wheel on the two members. An adjustable interlocking connection is provided between the clamping members permitting them to be separated at different distances from each other to secure the projections. A bolt connects the two clamping members between the interlocking connection and the wheel engaging projections, this bolt being so connected to the clamping member on the inner side of the wheel that it may be attached to the clamping member by a person situated on the outside of the wheel. Provision has also been made whereby the non-skid chains may be connected or disconnected from the clamping means, this connection being provided while the non-skid attachment is attached to a wheel.

What I claim as my invention and desire to secure by Letters Patent is:—

1. A non-skid attachment comprising two clamping members, wheel engaging means on the clamping members for engaging opposite sides of a wheel, an interlocking connection between the clamping members arranged to be positioned on the inner side of the felly of the wheel, means connecting the clamping members between the wheel engaging means and the interlocking connection for drawing said wheel engaging means in firm engagement with the opposite sides of the wheel, and a non-skid device connecting said clamping members.

2. A non-skid attachment for vehicle wheels comprising two clamping members, projections carried by said clamping members for engaging opposite sides of a vehicle wheel, an interlocking connection between said members embodying two arms, one extended from each member toward the other, and one of said arms being provided with the projection and the other of said arms having an opening receiving said projection, means connecting said clamping members between the wheel engaging projections and the interlocking connection for drawing said wheel engaging projections in engagement with opposite sides of the wheel, and a non-skid device connecting said clamping members.

3. A non-skid attachment for vehicle wheels comprising two clamping members each provided with an arm extending toward the other, one of said arms having a projection and the other of said arms having an opening receiving said projection, a wheel engaging projection carried by each of said members, a non skid device connecting said members, and means connecting said clamping members between the arms and the wheel engaging projections for maintaining the arms in interlocking relation and the wheel engaging projections in cooperation with opposite sides of the wheel.

4. A non-skid attachment for vehicle wheels comprising two clamping members, each provided with an arm extending one toward the other and lying in abutting relation, each of said arms having a series of openings and each of said arms having its end turned laterally and extending through an opening of the other arm, a wheel engaging means carried by each of said clamping members, means connecting said clamping members between the wheel engaging means and said arms for holding the arms in interlocking relation and the wheel engaging means in cooperation with opposite sides of the vehicle wheel, and a non-skid device connecting said clamping members.

5. A non-skid attachment for vehicle wheels comprising two clamping members, an interlocking connection between the clamping members adapted to be arranged on the inside of the felly of the wheel, wheel engaging projections on said clamping members situated to cooperate with opposite sides of the wheel, the projection on one member being situated nearer the center of the wheel than that on the other member, means connecting the clamping members between the projections and the interlocking connection, and a non-skid device connecting said clamping members.

6. A non-skid attachment for vehicle wheels comprising two clamping members, wheel engaging means connected to the clamping members for engaging opposite sides of the wheel, an interlocking connection between said clamping members arranged to lie on the inside of the felly, one of said clamping members being provided with an opening and a slot leading from the opening, and a bolt for connecting said clamping members between the interlocking connection and the wheel engaging means having a head adapted to pass through the opening and adapted to be received in the slot so that the bolt may be connected with the clamping members from the outside of the wheel.

7. A non-skid attachment for vehicle wheels comprising an anchoring means having portions adapted to lie on opposite sides of the wheel, each portion being provided with two openings, a non-skid device for passing about the tire, and detachable connections between the ends of the non-skid device and the anchoring means comprising a U shape member at each end of the non-skid device having its arms lying on the outside of the portion of the anchoring means to which it is connected, deflected laterally and inwardly through the two openings, and thence toward the center of the wheel substantially parallel with the main portion of the member on the inner side of the portion of the anchoring means to which said member is connected.

8. A non-skid attachment for vehicle wheels comprising two clamping members, each having means for engaging opposite sides of a vehicle wheel, a non-skid device for passing about a tire a detachable connection between the ends of the non-skid device and the clamping members, each embodying a U-shaped member having its arms deflected laterally and thence in the direction of and substantially parallel with the main portion of the arms, the clamping members having for each member a pair of openings in which the laterally extending portions lie so that the ends cooperate with the inner face of said members and the main portions of the U-shaped members lie on the outer sides of the clamping members.

JACOB S. KOMINZ.